United States Patent [19]
Terés

[11] Patent Number: 5,812,498
[45] Date of Patent: Sep. 22, 1998

[54] DEVICE FOR INPUTTING DATA INTO ELECTRONIC DATA PROCESSING MEANS

[75] Inventor: Yvan Terés, Cressier, Switzerland

[73] Assignee: Asulab, S.A., Bienne, Switzerland

[21] Appl. No.: 789,630

[22] Filed: Jan. 27, 1997

[30] Foreign Application Priority Data

Feb. 23, 1996 [FR] France ................................. 96 02266

[51] Int. Cl.$^6$ .......................... G04B 47/00; G04C 17/00; G06F 3/02
[52] U.S. Cl. ................................ 368/10; 368/69; 345/173
[58] Field of Search .............................. 368/10, 41, 43, 368/69–70, 314–321; 345/168, 172–174; 400/485, 489; D14/115

[56] References Cited

U.S. PATENT DOCUMENTS

| | | |
|---|---|---|
| D. 287,854 | 1/1987 | Crews ..................................... D14/100 |
| 556,922 | 3/1896 | Kunowski . |
| 4,199,751 | 4/1980 | Piguet ................................... 340/365 S |
| 4,272,826 | 6/1981 | Deutsch .................................. 364/709 |
| 4,555,464 | 11/1985 | Rogers ..................................... 368/10 |
| 5,017,030 | 5/1991 | Crews ..................................... 400/485 |

*Primary Examiner*—Vit W. Miska
*Attorney, Agent, or Firm*—Richard K. Robinson

[57] ABSTRACT

The device comprises a keyboard wherein each key is associated with an underlying sensor sensitive pad which controls the input of data associated with said key in response to an application of a finger on such key, such sensitive pads being closely set together within a closed contour ($V_1$, $V_2$; $V'_1$, $V'_2$) having, for a user, an upper part ($V_1$) and a lower part ($V_2$) respectively adjacent to first and second series of pads, such device being characterized in that the areas of the pads (10, 11, 12, 13; 7, 8, 9, ÷) of the first series are on the whole greater than the areas of the pads (3 to 9; 0, ., =, +) of the second series.

6 Claims, 1 Drawing Sheet

DEVICE FOR INPUTTING DATA INTO ELECTRONIC DATA PROCESSING MEANS

The present invention relates to a device for inputting data into electronic data processing means. More particularly, the invention relates to a device of this type comprising a keyboard wherein each key is associated with an underlying sensor sensitive pad which controls the input of data associated with said key in response to the application of a finger on such key.

There is known, in particular from French patent application no. 94 03480 in the name of the applicant, a device of this type associated with a watch for controlling several functions of such watch, such as time-setting, starting or stopping a chronometer, in place of the usual push buttons. There is also known from European patent application no. 0 165 548 a wristwatch comprising a digital display device, an adjacent keyboard and electronic display means for controlling the display of the time on the display device, or the results of intermediate or final calculations implemented with the aid of the keyboard.

The keys of the keyboard incorporated in such watches are formed by sensors of different types, for example piezoelectric, photosensitive, resistive or capacitive sensors. In the latter case, the sensitive pad of each sensor can be formed by a transparent electrode provided on the inner face of the watch crystal. By placing a finger on a pad of the outer face of such crystal which superimposes such electrode, an electric capacitor is formed between such finger and the electrode, separated by the dielectric constituted by the crystal. An electronic circuit sensitive to the capacity of such capacitor identifies the electrode in play and thus the nature or the operation thereby selected for one or other of the aforementioned applications.

FIG. 1 shows, by way of example, the arrangement and the shape of the different electrodes which can be formed on a circular shaped watch crystal V. These electrodes may be identified by visible numerical figures 0 to 12, and by the symbols of the various operations used in numerical calculation. The numerical figures may be arranged in a first ring, like the marks for the hours of the day, the operation symbols being situated here on another inner ring with respect to the first ring and the zero being situated at the centre of the crystal. The electrodes of a same ring are then conventionally of identical shape and surface, the figures and other symbols being centred on the corresponding electrode.

It is seen that since the surface of print D (see FIG. 1) of a finger is not very small in relation to that of a watch crystal, which is itself limited in particular when it concerns a wristwatch, it is difficult to place the finger on the watch crystal, above one of the electrodes shown in FIG. 1, without thereby affecting the adjacent electrodes. In order then to identify, among the affected electrodes, that which was targeted, the electronic means incorporated in the watch must develop complex identification strategies.

Recourse to such strategies could be omitted, or at least limited, if the shapes of the close set electrodes of the keyboard were adapted to the conditions in which the finger/keyboard contact is operated.

An object of the present invention is precisely to provide a device for inputting data into electronic data processing means, by means of a keyboard which is ergonomically adapted to said finger/keyboard contact.

These objects of the invention are achieved, with others which will appear upon reading the description which follows, with a device for inputting data into electronic data processing means, comprising a keyboard each of whose keys is associated with an underlying sensitive pad of a sensor which controls the input of data associated with said key in response to an application of a finger on such key, such sensitive pads being closely set together within a closed contour having, for a user, an upper part and a lower part respectively adjacent to first and second series of pads, such device being characterised in that the areas of the pads of the first series are on the whole greater than the areas of the pads of the second series.

According to another feature of the device according to the invention, at least one of the symbols borne by the keys of the keyboard is closer to the upper part of the closed contour than the centre of the associated sensitive pad.

As will be seen hereinafter, these features advantageously combine to optimise matching of fingerprints with the sensitive pads of the sensors of the device.

Other features and advantages of the present invention will appear upon reading the description which follows and upon examination of the attached drawings in which.

Figure 1:
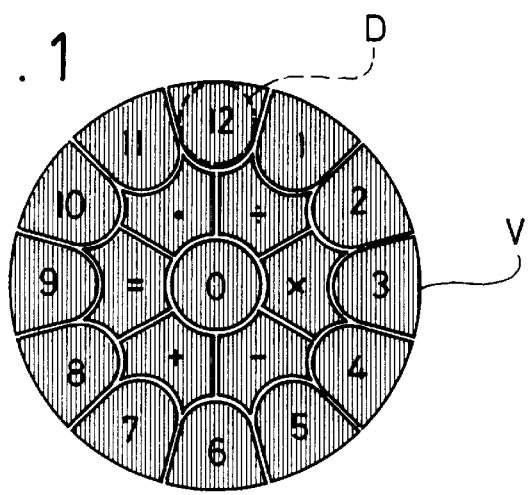
FIG. 1 is an enlarged schematic view of a conventional arrangement of electrodes on a watch crystal, described and discussed in the preamble to the present description.
Figure 2:
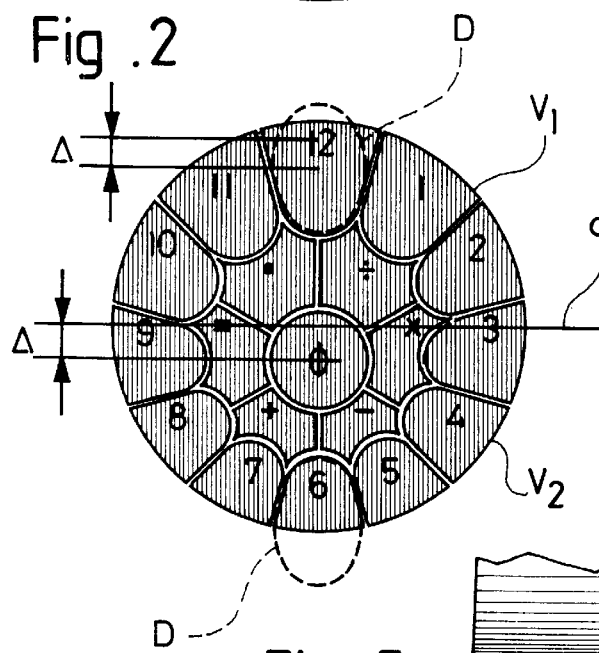
FIG. 2 is a schematic view, similar to that of FIG. 1, of a first embodiment of the electrode arrangement of the device according to the present invention.
Figure 3:
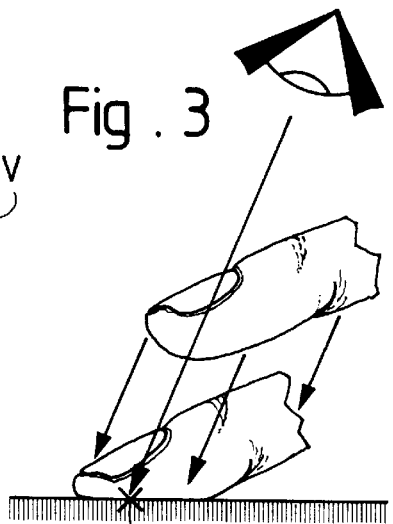
FIGS. 3 and 4 are diagrams useful for understanding the present invention.
Figure 4:
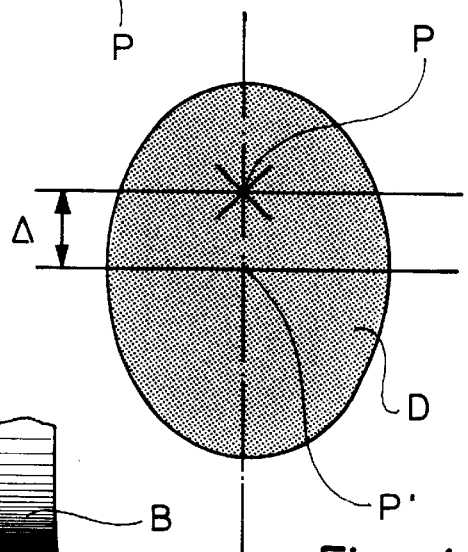

Referring to FIG. 2 of the attached drawings where the two rings of sensitive pads, or electrodes, of figure 1 are seen, such electrodes being borne by the inner face of a watch crystal forming part of the device according to the invention, such crystal having a closed contour, which in the present case is circular. This contour may be divided into two respectively upper and lower parts $V_1$ and $V_2$, separated by a diameter d of the watch crystal. Such diameter is substantially parallel to an axis passing through the eyes of a user who wears the watch on his arm with the aid of a bracelet (not shown) in the conventional manner.

The device further comprises electronic means (not shown) for processing data input therein the aid of the keyboard thus formed, either for controlling the time display hands, or for displaying partial or final results of calculations on a display (not shown), for example a liquid crystal display.

The ring of peripheral sensitive pads of the watch crystal then divides into first and second series which follow respectively upper part $V_1$ and lower part $V_2$ of the contour of the crystal. These two series are marked by visible symbols showing the data input by contact of a finger with the watch crystal, numerical FIGS. 1 to 12 or symbols for operations. It is in this manner that the first and second series of pads are formed by pads (10, 11, 12, 1, 2) and (3, 4, 5, 6, 7, 8, 9) respectively.

It is immediately apparent upon examining FIG. 2 that the pads of the first series (10, 11, 12, 1, 2) have a larger area than those of the pads of the second series (3 to 9), the areas of the pads of the conventional arrangement shown in FIG. 1 being situated between the two.

By thus increasing, in accordance with the invention, the areas of the first series in relation to those of the conventional arrangement, one thus eliminates or reduces covering of adjacent pads by the contour of a fingerprint applied to the watch crystal above a selected pad, as illustrated in FIG. 2 on pad 12.

However, this increase in the first series pad surfaces requires reducing the surfaces of the second (lower) series if it is not desired to increase the surface of the watch crystal, which is preferable. The surfaces of pads 3 to 9 of the second series are then reduced further than in the conventional arrangement of FIG. 1. This has no drawbacks, quite the reverse. Indeed, as illustrated on pad 6, fingerprint D falls mainly, as regards the pads of the second series, outside part $V_2$ of the contour of the crystal, which reduces the useful surface of the print and its possible influence on the adjacent pads.

The correspondence between the fingerprint surfaces and those of the associated sensitive pads can be further improved. Indeed, as illustrated schematically in FIGS. 3 and 4, studies have shown that the print left by an observer's finger around a mark P formed on a surface and on which the latter aimed to apply a finger, is systematically off-centre with respect to the mark at which he aimed. The substantially oval contour of said print D is centred on a point P' staggered at a distance Δ towards the bottom of the surface which bears mark P, while no appreciable staggering is noted from point P' in the orthogonal direction to that of the staggering of amplitude Δ. One has been able to measure that Δ varied usually between approximately 2 and 4 mm. This staggering can be explained by the morphological features of human beings and by the operation of human eyes for identifying a point in space.

One can also draw upon this observation in order to improve further the covering of a sensitive pad and of the print of a finger placed thereupon via aiming at a symbol or a mark visible on such pad. In order to do so, according to the invention, the symbol aimed at is staggered, towards the upper part of the contour, by said distance Δ, with respect to the geometrical centre of the pad marked by such symbol, as is shown in particular for the number 12 marking one of the pads shown in FIG. 2. The contours of each of the pads may be drawn, to the extent possible, so as to conform to that of a fingerprint on the watch crystal, as it is placed on the latter by aiming at the symbol marking the pad. Interfering overlapping of such print on the adjacent pad parts is thus avoided as best as possible.

Figure 5:
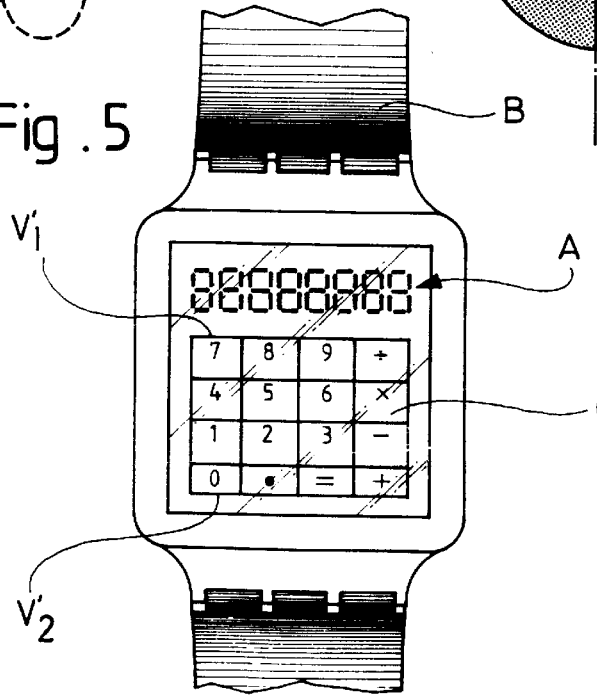
FIG. 5 is a schematic diagram of a wristwatch fitted with another embodiment of the device according to the invention.

FIG. 5 shows another embodiment of the invention, incorporated into a watch comprising a display A arranged above a digital keyboard C. The watch attaches to a user's wrist with the aid of a bracelet B. For the purposes of simplification, it is assumed that the sensitive pads of the device are congruous with the keys of keyboard C. The area of each of the keys (7, 8, 9, ÷), which lie along upper part $V_1$ of the contour of the keyboard, is larger than that of keys (0, ., =, +) which lie along lower part $V'_2$ of such contour. The two intermediate rows may advantageously be of identical dimensions to those of the upper row. The visible symbols on the keys are staggered upwards, for the reasons explained in connection with FIG. 2.

It is now apparent that the invention allows the object fixed therefor to be achieved, namely to improve the ergonomics of a keyboard of the type envisaged hereinbefore, in particular when the area of the total surface of such keyboard is small, substantially less than n times the area of a fingerprint, n being the number of keys of the keyboard.

Of course the invention is not limited to the embodiments described and shown which have been given only by way of example. Thus the invention can be applied to products other than wristwatches or other apparatus capable of being fixed to the arm of a user, and in particular to any keyboard of reduced surface such as a miniature calculator able to be slipped inside a wallet for example.

It will also be noted that according to an alternative particularly suited to the embodiment shown in FIG. 5, sensitive pads having an identical area for all the keys may be provided with all the symbols (7, 8, 9, etc.) staggered towards the top of the keyboard at distance Δ.

What is claimed is:

1. A device for inputting data into electronic data processing means, comprising a keyboard each of whose keys is associated with an underlying sensitive pad of a sensor which controls the input of data associated with said key in response to an application of a finger on such key, such sensitive pads being closely set together within a closed contour having, for a user, an upper part and a lower part respectively adjacent to first and second series of pads, the areas of the pads of the first series being on the whole greater than the areas of the pads of the second series.

2. A device according to claim 1, comprising a set of visible symbols each borne by one of the keys to identify the data whose input is controlled by said key, wherein at least one of said symbols is closer to the upper edge of the closed contour than the centre of the associated sensitive pad.

3. A device according to claim 2, wherein the distance separating said symbol and said centre is comprised approximately between 2 and 4 mm.

4. A device according to claim 1, wherein the area of the inner surface of the closed contour is substantially less than n times the area of the print of a finger on the keyboard, n being the number of keyboard keys.

5. A wristwatch comprising a device for inputting data into electronic data processing means, comprising a keyboard each of whose keys is associated with an underlying sensitive pad of a sensor which controls the input of data associated with said key in response to an application of a finger on such key, such sensitive pads being closely set together within a closed contour having, for a user, an upper part and a lower part respectively adjacent to first and second series of pads, the areas of the pads of the first series being on the whole greater than the areas of the pads of the second series.

6. A wristwatch according to claim 5, comprising a watch crystal having a face, wherein the sensitive pad assembly is borne by a face of the watch crystal.

* * * * *